United States Patent [19]
Sander et al.

[11] Patent Number: 5,161,611
[45] Date of Patent: Nov. 10, 1992

[54] CHANNEL PLATE ASSEMBLY WITH PARALLEL PLATES, PROCESS AND FIXTURE FOR MANUFACTURING THE SAME, AND PLATE APPARATUS PROVIDED WITH THE SAME

[75] Inventors: Ulrich Sander, Friedrichsdorf; Helmut Zeh, Altenstadt; Rudolf Wilhelm, Kelsterbach, all of Fed. Rep. of Germany

[73] Assignee: Metallgesellschaft Aktiengesellschaft, Frankfurt am Main, Fed. Rep. of Germany

[21] Appl. No.: 599,310

[22] Filed: Oct. 17, 1990

[30] Foreign Application Priority Data

Oct. 17, 1989 [DE] Fed. Rep. of Germany ....... 3934583

[51] Int. Cl.$^5$ ................................................ F28F 3/08
[52] U.S. Cl. ...................................... 165/166; 165/167; 165/170
[58] Field of Search .................... 165/167, 170, 166

[56] References Cited

U.S. PATENT DOCUMENTS

| | | | |
|---|---|---|---|
| 1,992,097 | 2/1935 | Seligman | 165/167 |
| 2,686,154 | 8/1954 | MacNeill | 165/166 X |
| 3,246,689 | 4/1966 | Remde et al. | 165/170 X |
| 4,287,883 | 9/1981 | Kyrias | 126/445 |
| 4,403,652 | 9/1983 | Schiltz et al. | 165/167 |

FOREIGN PATENT DOCUMENTS

| | | | |
|---|---|---|---|
| 880591 | 5/1953 | Fed. Rep. of Germany | 165/167 |
| 2054817A | 2/1981 | United Kingdom | 165/167 |

*Primary Examiner*—Allen J. Flanigan
*Attorney, Agent, or Firm*—Michael J. Striker

[57] ABSTRACT

A channel plate assembly comprises parallel plates, which are joined to each other and define passages for a first flowing fluid. Each of said passages is continuously defined on all sides in the direction of flow. Parallel plates are interconnected by spacers, which are spaced apart in the direction of flow and have a width that is smaller than the width of each passage which is continuously defined in the direction of flow. A process of manufacturing the channel plate assembly, two fixtures for use in carrying out the process and the use of the channel plate assembly for supplying and/or discharging a first flowing fluid in a plate apparatus are provided.

5 Claims, 7 Drawing Sheets

CHANNEL PLATE ASSEMBLY WITH PARALLEL PLATES, PROCESS AND FIXTURE FOR MANUFACTURING THE SAME, AND PLATE APPARATUS PROVIDED WITH THE SAME

BACKGROUND OF THE INVENTION

The present invention relates to a channel plate assembly comprising parallel plates, which are joined to each other and confine passages for a first fluid medium, each of which passages is continuously defined on all sides in the direction of flow. The invention relates also to a process and fixtures for manufacturing the channel plate assembly. Finally, the invention relates to the use of the channel plate assembly in a plate apparatus.

Problems arise in the supply of flowing fluids to the flow-conducting plates of plate apparatuses, such as plate-type heat exchangers and separators for removing components from flowing mixtures by means of selectively permeable sheet material. It is necessary, on the one hand, to supply the flowing fluids in a distribution which is as uniform as possible to the flow-guiding plates of the plate apparatus. On the other hand, the pressure drop must be minimized, and this will be very difficult particularly if the flow rates of the fluid are high. Published German Application 36 01 909 describes an apparatus for separating individual components from flowing fluid mixtures by means of selectively permeable sheet material (pervaporization, permeation of gas, reverse osmosis, ultrafiltration). That separating apparatus consists of a stack of substantially rectangular platelike elements, which have identical external contours and have been assembled from commercially available flow-guiding plates of plate-type heat exchangers to form a stack and are sealed at their edges and compressed between terminal flow-guiding plates by means of tie rods so that shallow flow-utilizing spaces are provided in the interior of the stack and integrated supply and discharge passages for flowing fluids are provided at the four corners. The flowing fluids are supplied by means of channel plate assemblies, each of which consists of a base plate formed with grooves and a cover plate, which are joined to each other. Each channel plate assembly has the same thickness as the flow-guiding plate. The cover plate has edge strips, which protrude beyond the base plate and are used to fit the channel plate assembly in corresponding supports provided on the flow-guiding plate. The channel plate assembly described in Published German Application 36 01 909 has the disadvantage that fluids flowing at a high rate will suffer a relatively high pressure drop. A plate apparatus in which flowing fluids are supplied through a channel plate assembly as disclosed in Published German Application 36 01 909 cannot be used to effect an adequate removal of individual components from flowing fluids by vapor permeation.

SUMMARY OF THE INVENTION

It is an object of the invention to provide a channel plate assembly which permits the pressure drop to be minimized even when fluids flow at a high flow rate and to ensure a uniform distribution of the flowing fluid to the flow-guiding plates of the plate apparatus. It is another object of the invention to provide for the manufacture of the channel plate assembly a technically simple process which is reliable in operation and to provide fixtures for use in the manufacturing process.

The object underlying the invention is accomplished in that the parallel plates are interconnected by spacers, which are spaced apart in the direction of flow and have a width that is smaller than the width of each passage which is continuously defined in the direction of flow. The term flowing fluids describes all fluid, gaseous or vaporous mixtures or pure substances which are to be separated into individual components or thermally treated in the plate apparatus. The spacers may consist of any parts which can be joined to the plates. For instance, the spacers may consist of pieces of wire, which have a rectangular, circular or oval, e.g., elliptical shape in cross-section. In a spacer having a constant cross-section in the direction of flow of the first flowing fluid the width of the spacer will be the thickness of the spacer on the level corresponding to one-half of the distance between the parallel plates, measured transversely to the direction of flow of the first flowing fluid. If the cross-sectional area of the spacer is not constant in the direction of flow of the first flowing fluid, the width of the spacer will be the average thickness of the spacer on the level corresponding to one-half of the distance between the parallel plates measured transversely to the direction of flow of the first flowing fluid. The several passages which are confined by the parallel plates are continuously defined, i.e., the several passages do not communicate with each other. The advantage afforded by the use of such channel plate assembly in accordance with the invention resides in that the pressure drop suffered by fluids flowing at a high rate can be kept relatively low but a uniform distribution of the flowing fluids on each flow-guiding plate of the plate apparatus will be ensured. For instance, if channel plate assemblies in accordance with the invention are used in a separator for removing individual components from flowing mixtures, as is described in DE 36 01 909, individual components can be removed to an adequate degree even by vapor permeation. If the width selected for each spacer is smaller than the width of each of the passages which are continuously defined in the direction of flow, the flow area of each passage will be relatively small so that the pressure drop will be reduced. The increase of the flow area in accordance with the teaching of the invention results in a saving of material because contrary to the manufacture of the channel plate assembly described in Published German Application 36 01 909 it is not necessary to mill grooves into a plate in order to form the several flow passages. The thickness of the channel plate assembly in accordance with the invention can be selected in adaptation to the thickness of any of the commercially available flow-guiding plates for use in plate apparatuses so that a subsequent installation into existing plate apparatuses will be permitted. It is not necessary to provide one plate with edge strips which protrude beyond the other plate and which are fitted into supports of a flow-guiding plate, as is described in Published German Application 36 01 909. It is possible to use also parallel plates which are equal in size and the channel plate assembly in accordance with the invention can be secured, e.g., by adhesion, in a recess of flow-guiding plate. In dependence on the application the channel plate assembly in accordance with the invention may be integrated in a sealing frame of a separator which has a selectively permeable membrane fixed in such frame. The passages for a first flowing fluid need not be parallel to each other but the passages may also constitute a starlike array.

In accordance with a preferred feature of the invention the plates have a thickness from 0.1 to 1 mm. With plates having such a thickness, the thickness of the channel plate assemblies in accordance with the invention can easily be adapted to the thickness of commercially available treating plates and frames of plate apparatuses. Besides, plates having a thickness from 0.1 to 1 mm will impart a high stability to the channel plate assembly in accordance with the invention so that the channel plate assembly in accordance with the invention can even be used in plate apparatuses in which high pressures prevail.

In accordance with a further preferred feature of the invention the spacers consist of metal strips. This will afford the advantage that the spacers can be joined on large surfaces on the parallel plates so that the channel plate assemblies in accordance with the invention will have a higher stability.

In accordance with a further feature of the invention the spacers consist of metal strips having a thickness from 0.1 to 1 mm and a width from 0.5 to 5 mm. Metal strips having such dimensions will impart to the channel plate assembly in accordance with the invention an adequate stability against an application of pressure and can relatively easily be joined to the parallel plates.

The object underlying the invention is also accomplished by a process which is used to manufacture a channel plate assembly and in which the spacers are fixed in a fixture and joined to a first plate and on that side which faces away from the first plate are subsequently joined to another plate in a fixture. That process affords the advantage that the spacers can easily be centered and that each spacer can be joined to the first and second plates in such a manner that a distortion of the plates during the manufacture of the channel plate assembly in accordance with the invention can be precluded. The process can be carried out relatively quickly so that even large numbers of channel plate assemblies in accordance with the invention can be made within relatively short time.

In accordance with a further preferred feature of the invention the plates are joined to the spacers by spot welding. In that manner the spacers can quickly and reliably be joined to the individual plates.

In accordance with a further feature the plates are joined to the spacers by spot welding at locations which are spaced 2 to 100 mm apart. In that case the passages which are confined by the parallel plates and serve to conduct a first flowing fluid can continuously be confined in a technically simple manner and can thus tightly be selaed from each other.

The object underlying the invention is also accomplished by the provision of a fixture which consists of a carrier plate having groovelike recesses and at least one opening. The use of such a fixture will afford the advantage that the plate that is to be joined to the spacers is contacted with all spacers at the same time so that the spacers can be joined to a given plate at the same time in an automatic production. Each groovelike recess conforms to the external shape of the spacers so that they can easily be fixed in the groovelike recesses. The provision of the opening facilitates the joining of the spacers to the plates.

In accordance with a further feature of the invention the carrier plate is provided on one longitudinal edge and one transverse edge with respective stops. This will afford the advantage that a given plate which is to be joined to the spacers can be fixed in the fixture so that the spacers can more easily be joined to the plate concerned.

The object underlying the invention is also accomplished by the provision of a further fixture which consists of a carrier plate having at least one opening and at least one stop, which is provided with a groove that is parallel to the plane of the carrier plate. Such a fixture will permit the manufacture of the channel plate assembly in accordance with the invention from parallel plates which differ in size. When the spacers have been fixed to the smaller plate, the larger plate can be fixed in a groove to extend parallel to the plane of the carrier plate so that the individual spacers can again quickly be joined to the larger palte in that case.

In accordance with a further feature of the invention the openings consist of bores. This will facilitate the joining of the spacers to the plates by spot welding because the electrode employed can be inserted through the bores so that the location of each welding spot can more easily be determined.

In accordance with a further feature of the invention the carrier plates and the stops of the fixtures consist of an electrically non-conductive material. That feature will permit each spacer to be relatively easily joined to the plates by an electric welding process.

Finally, the invention relates to the use of the channel plate assembly for supplying and/or discharging a first flowing fluid in a plate apparatus, in which the channel plate assembly is mounted in and flush with a flow-guiding plate or a frame, and is provided with an inlet or outlet for a first flowing fluid. This will permit a particularly uniform distribution of the flowing fluid on the flow-guiding plate. Even if the fluid flows at a high rate the fact that the flow area is increased in accordance with the invention will minimize the pressure drop in the plate apparatus. If the channel plate assembly is directly connected to an inlet, the access of the first flowing fluid to the channel plate assembly in accordance with the invention will be ensured. If the channel plate assembly is connected to an outlet, the flowing fluid can directly be withdrawn from the channel plate assembly in accordance with the invention.

In accordance with a further feature of the invention a plate apparatus is employed which consists of a separator for removing individual components from flowing fluids by means of selectively permeable sheet material and which comprises at least one stack comprising like components which include flow-guiding plates of heat exchangers and are provided with flow-utilizing internal spaces and with integrated inlets and outlets for a first flowing fluid. In that case the flowing fluid which comprises the individual components is desirably distributed over the membrane in a relatively uniform manner. The separator may be, e.g., of the type described in Published German Patent Application 36 01 909. The pressure drop in such a separator may be kept relatively low. A further advantage resides in that individual components can be removed by vapor permeation. In that case the channel plate assembly in accordance with the invention can be mounted directly in the flow-guiding plate or in a sealing frame. Besides, the channel plate assembly used in a separator may be integrated in a frame in which a selectively permeable membrane is fixed.

In accordance with a further feature of the invention the plate apparatus which is employed consists of a plate-type heat exchanger. Because the channel plate assembly in accordance with the invention results in a uniform distribution of flowing fluids in the several chambers of a plate-type heat exchange, a thermal treatment can effectively be performed as the channel plate assembly in accordance with the invention permits an optimum utilization of the heat exchange surface area. Besides, the pressure loss in a plate-type heat exchanger can be minimized by the use of the channel plate assembly in accordance with the invention.

In accordance with a further feature of the invention the channel plate assembly is used in a plate-type heat exchanger in which at least one further passage for a second flowing fluid is provided between any two adjacent parallel channel plate assemblies. This will afford the advantage that a plate-type heat exchanger can be adapted relatively quickly to a change of the flow rate of flowing fluids because additional channel plate assemblies can be integrated in the heat exchanger or surplus channel plate assemblies can be removed from the heat exchanger.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
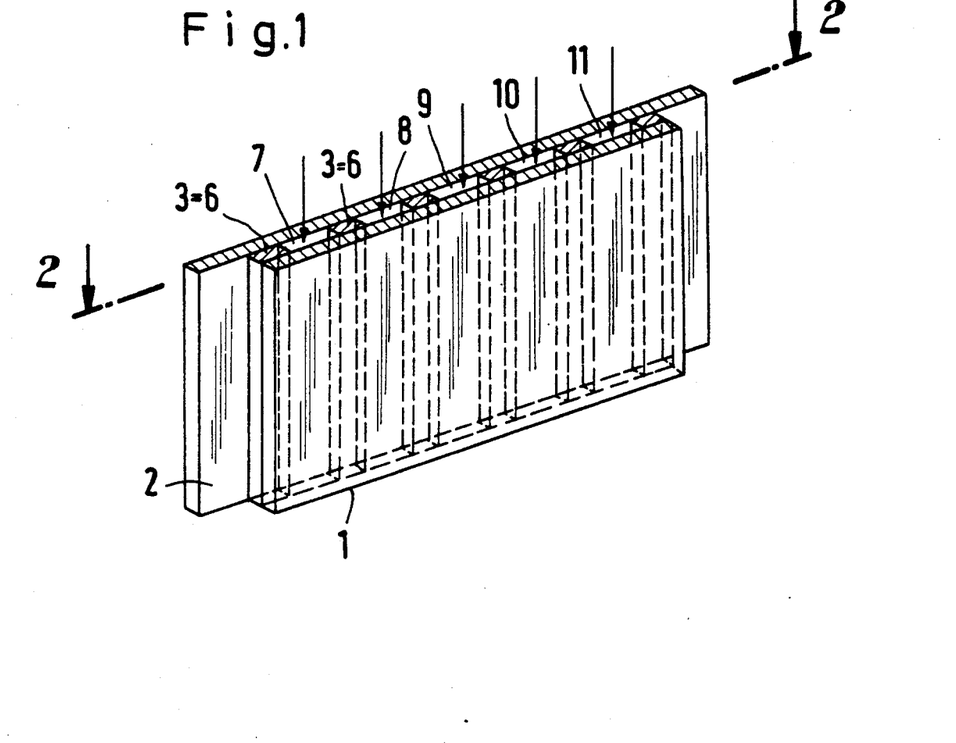
FIG. 1 is a perspective view showing a channel plate assembly.

FIG. 1 is a perspective view showing a channel plate assembly which is in accordance with the invention and comprises two parallel plates 1, 2, which are joined by spacers 3 and contain passages 7 to 11 for a first flowing fluid. In that embodiment, the spacers 3 consist of metal strips 6. The first flowing fluid enters the channel plate assembly in the direction indicated by the arrows and flows through the passages 7 to 11. In the channel plate assembly shown in FIG. 1 the second plate 2 is larger than the first plate 1 although that design feature is not essential.

Figure 2:
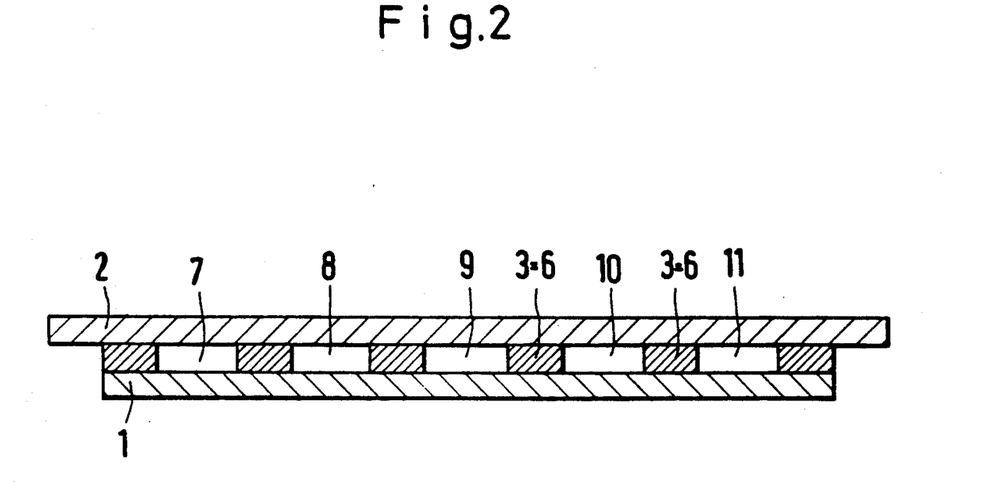
FIG. 2 is a sectional view taken on the line A—A in FIG. 1.

FIG. 2 is a sectional view taken on line A—A in FIG. 1. Spacers 3 consisting of metal strips 6 are disposed between the parallel plates 1, 2. As in FIG. 1, passages 7 to 11 for a first flowing fluid are also shown. In dependence on the flow rate of each flowing fluid, more than five passages or less than five passages for a first flowing fluid may be provided.

Figure 3:
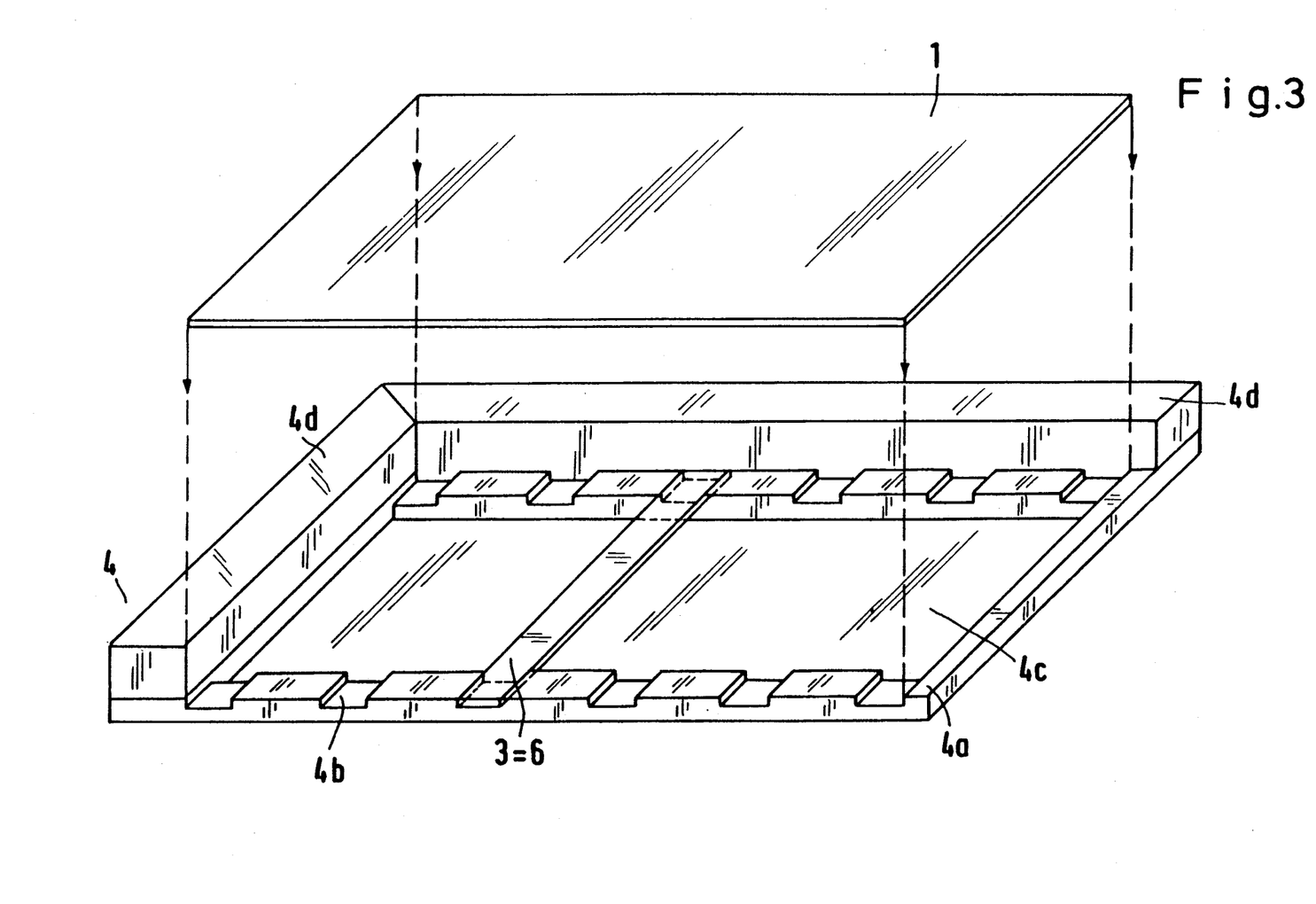
FIG. 3 shows a fixture comprising a carrier plate which has groovelike recesses, an opening, a spacer and a first plate.
Figure 4:
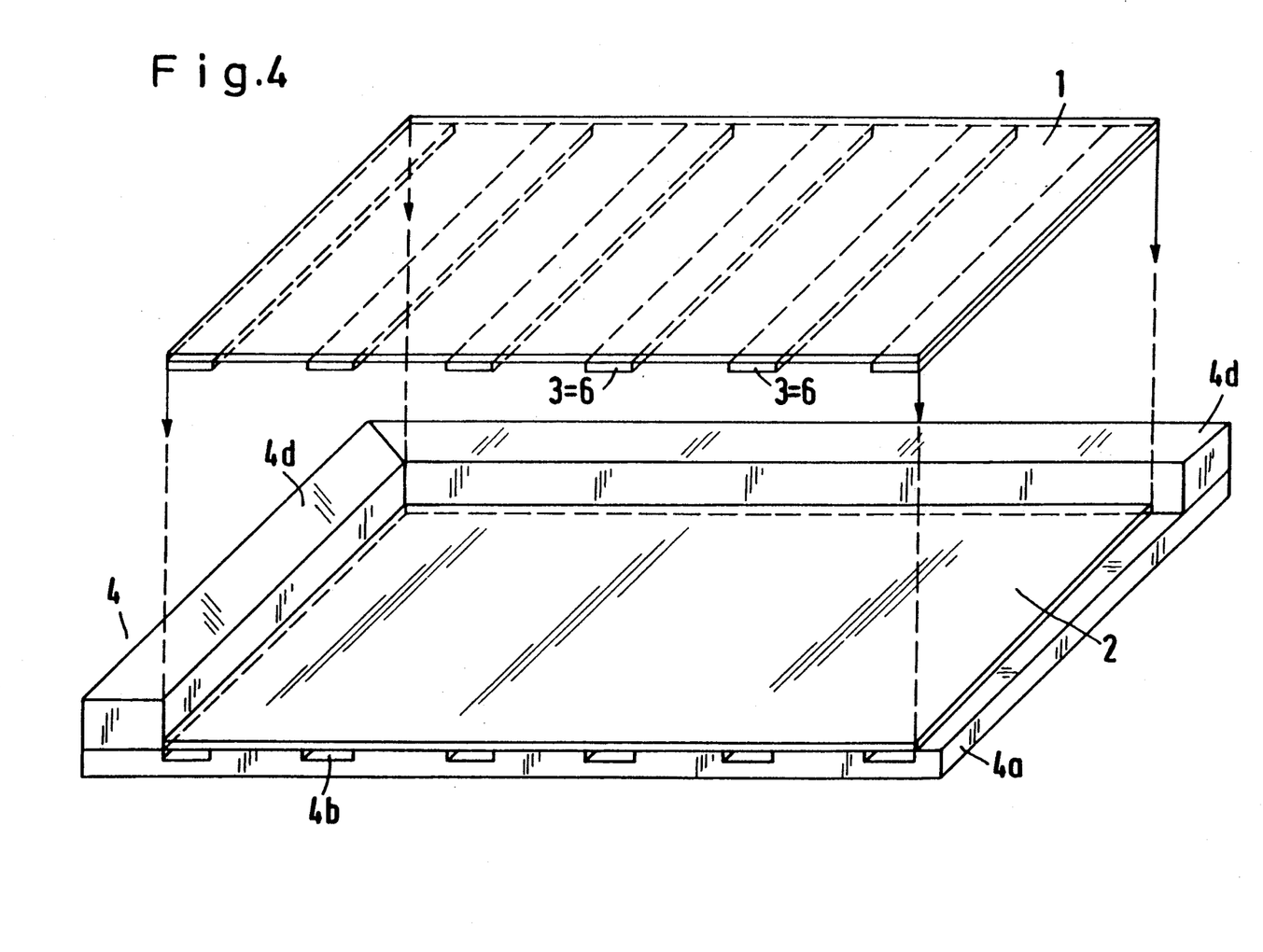
FIG. 4 shows a fixture as shown in FIG. 3 with first and second plates.
Figure 5:
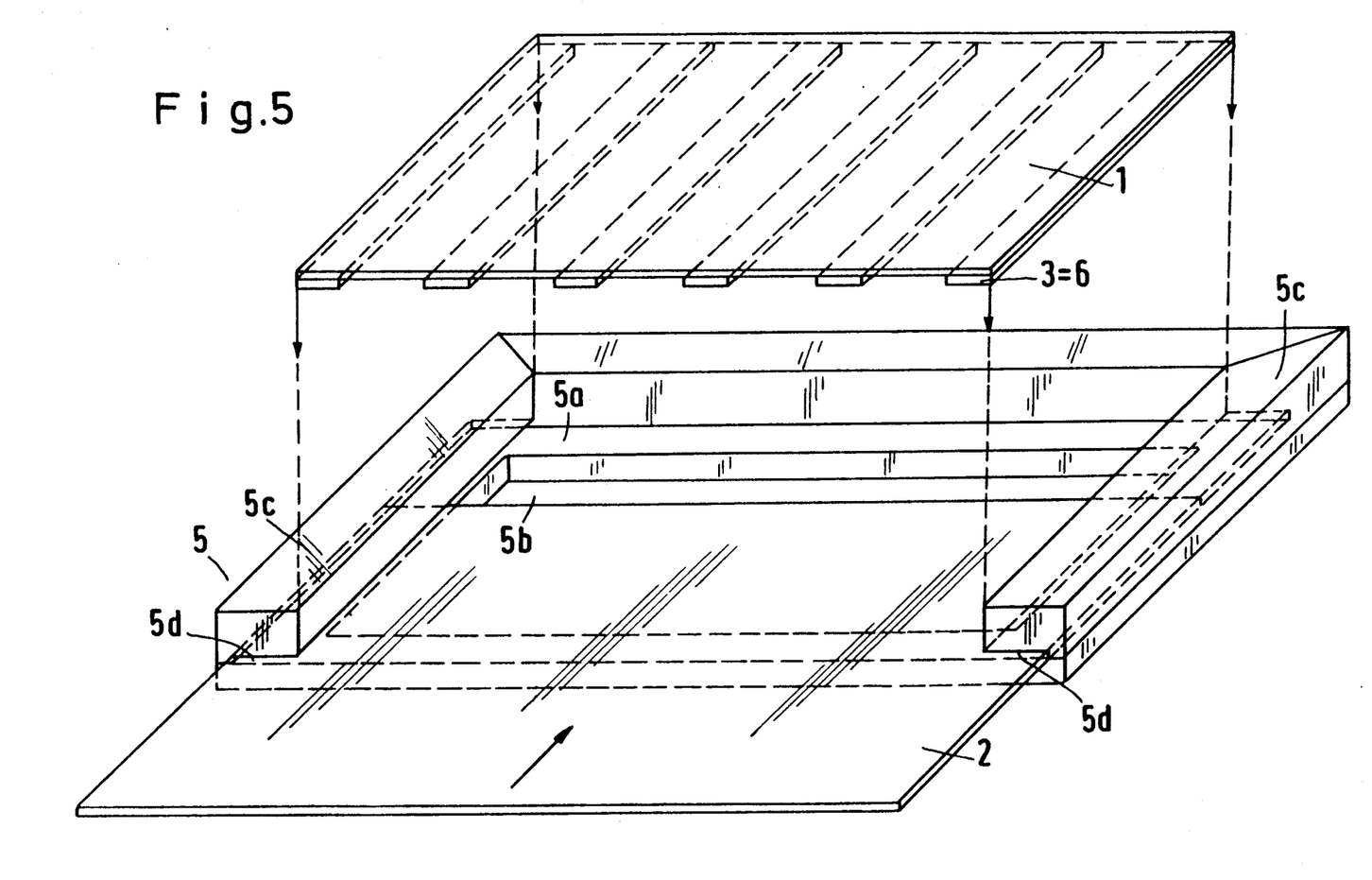
FIG. 5 shows a fixture comprising a carrier plate, an opening and a stop, which has a groove that is parallel to the plane of the carrier plate.

The process of manufacturing the channel plate assembly in accordance with the invention is illustrated in FIGS. 3 to 5. As is apparent from FIG. 3 the spacers 3 consisting in this case of metal strips 6 are initially inserted into groovelike recessed 4b of the carrier plate 4a. The carrier plate 4a is provided with a stop 4d and has an opening 4c. When the several spacers have been positioned in the groove-like recesses, the first plate 1 is placed on the carrier plate 4a and is positioned by the stop 4d of the fixture 4. The spacers 3 are then joined to the first plate 1, e.g., by welding. When the spacers 3 have been joined to the first plate 1 a second plate 2 is placed on the carrier plate 4a and is positioned by the stop 4d of the fixture 4, as is shown in FIG. 4. The spacers 3 are then placed on the second plate 2 to contact the latter on that side of the spacers 3 which faces away from the first plate 1. Because the first plate 1 has also been positioned by the stop 4d, the spacers 3 are now joined to the second plate 2, e.g., by welding. A channel plate assembly which is in accordance with the invention and comprises two parallel plates 1, 2 having the same size can be manufactured by that procedure. If the channel plate assembly is required to have laterally protruding edge strips, as is shown, e.g., in FIG. 1, i.e., if the second plate 2 is required to be larger than the first plate 1, a fixture 5 can be used in the manufacture of the channel plate assembly in accordance with the invention. FIG. 5 shows a fixture 5 comprising a carrier plate 5a that is provided with an opening 5b and with a stop 5c, which has a groove 5d that is parallel to the plane of the carrier plate 5a. The spacers 3 are initially joined in a fixture 4 to a first plate 1 in the manner described in detail hereinbefore. The larger second plate 2 is then inserted through the groove 5d of the fixture as far as to the stop 5c. The spacers joined to the first plate 1 are placed on the second plate 2 to contact the latter on that side of the spacers which faces away from the first plate 1. The plates are positioned by the stop 5c. The spacers are subsequently joined to the second plate 2, e.g., by spot welding. The opening 5b (see FIG. 5) and the opening 4c (see FIG. 3) permit an access of one electrode and may have different configurations.

Figure 6:
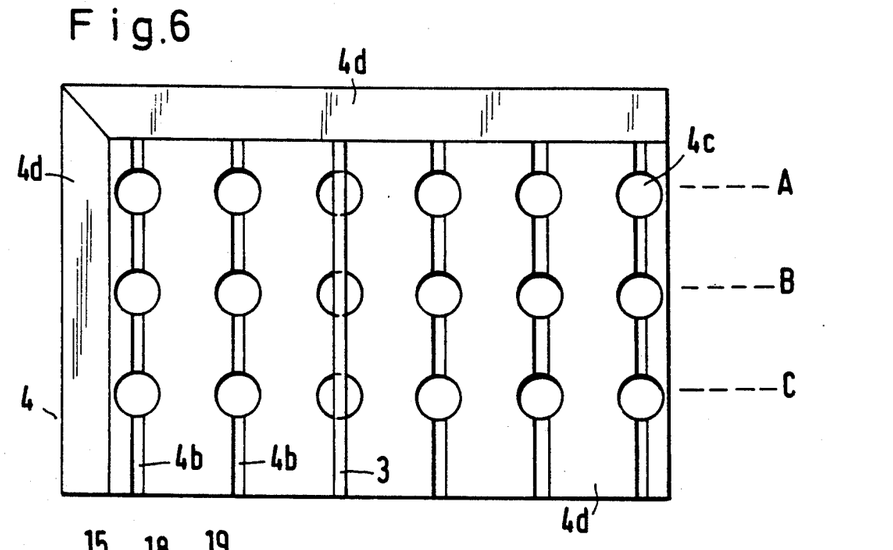
FIG. 6 is a top plan view showing a further fixture in which the openings consist of bores.

FIG. 6 is a top plan view showing a further embodiment of the fixture 4, which is provided with a stop 4d, a carrier plate 4a, which has groovelike recesses 4b, and openings 4c. The openings 4c consist of bores and are arranged in three rows of holes A, B, C. A spacer 3 is shown in one groovelike recess 4b. If the openings 4b consist of bores, the spacers 3 can be more easily joined to the plates 1, 2 by spot welding because the electrode can be guided in the associated opening 4c. This will facilitate an automatic manufacture.

Figures 7A, 7B, 7C:
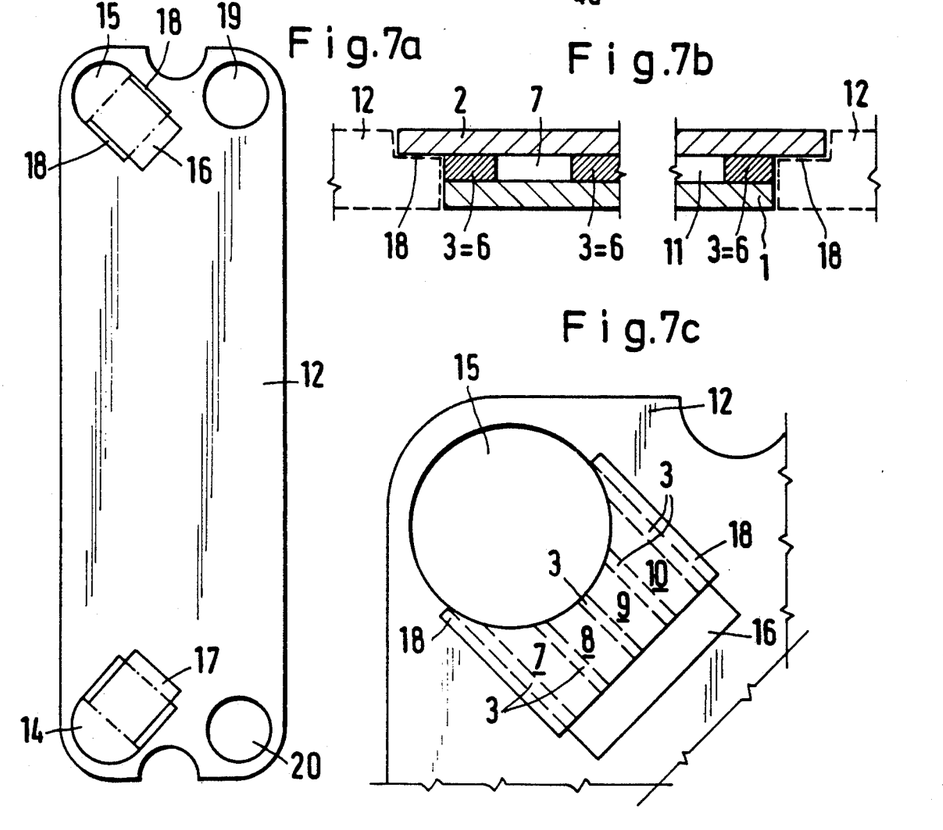
FIG. 7a shows a flow-guiding plate of a plate apparatus with two integrated channel plate assemblies in accordance with the invention.
FIG. 7b shows a possible arrangement of the channel plate assembly in a flow-guiding plate of a plate apparatus.
FIG. 7c is a fragmentary view showing a part of a flow-guiding plate of a plate apparatus with an integrated channel plate assembly having parallel passages.

FIG. 7a shows a flow-guiding plate 12 of a plate apparatus with two integrated channel plate assemblies in accordance with the invention. One channel plate assembly shown in phantom is connected to an inlet 14 for a first flowing fluid. The second channel plate assembly shown in phantom is connected to an outlet 15 for a first flowing fluid. The two channel plate assemblies shown in phantom are arranged in apertures 16 and 17 of the flow-guiding plate 12. The second plate 2 is larger than the first plate 1 and has been joined to supports 18 of the flow-guiding plate 12.

FIG. 7b is a transverse sectional view showing the channel plate assembly and the flow-guiding plate 12, which is provided with supports 18. The spacers 3 and the passages 7, 11 for a first flowing fluid are arranged between the plates 1 and 2. The second plate 2 is larger than the first plate 1 and is joined to the flow-guiding plate 12 by the supports 18. The second plate 2 can be joined to the support 18, e.g., by welding or by an adhesive.

FIG. 7c is a fragmentary view showing a part of the flow-guiding plate 12 provided with an integrated channel plate assembly and with an outlet 15 for a first flowing fluid. The channel plate assembly has parallel passages 7 to 10 for a first flowing fluid and in an aperture 16 is joined to the flow-guiding plate 12 by supports 18 as shown in FIG. 7b. The channel plate assembly differs from that shown in FIG. 7a in that it has a circular recess conforming to the outlet 15 for a first flowing fluid.

Figure 7D:
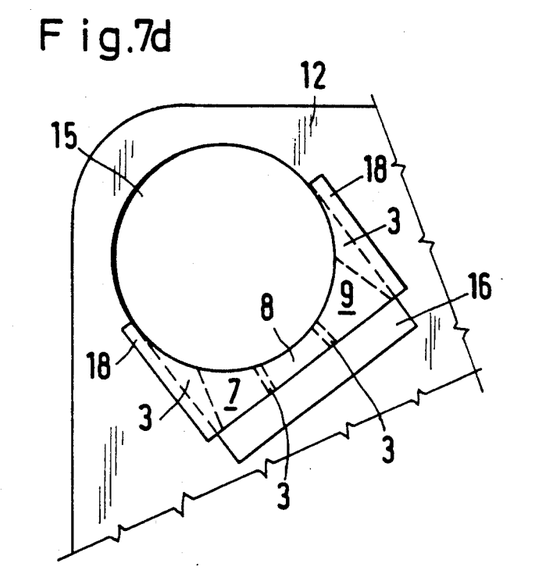
FIG. 7d is a fragmentary view showing a part of a flow-guiding plate of a plate apparatus with an integrated channel plate assembly having passages forming a starlike array.

FIG. 7d is another fragmentary view showing a part off a flow-guiding plate 12 provided with an outlet 15 for a first flowing fluid and with an integrated channel plate assembly. A difference from the channel plate assembly shown in FIG. 7c resides in that in the channel plate assembly shown in FIG. 7d the passages 7, 8 and 9 for a first flowing fluid form a starlike array.

Figure 8A:
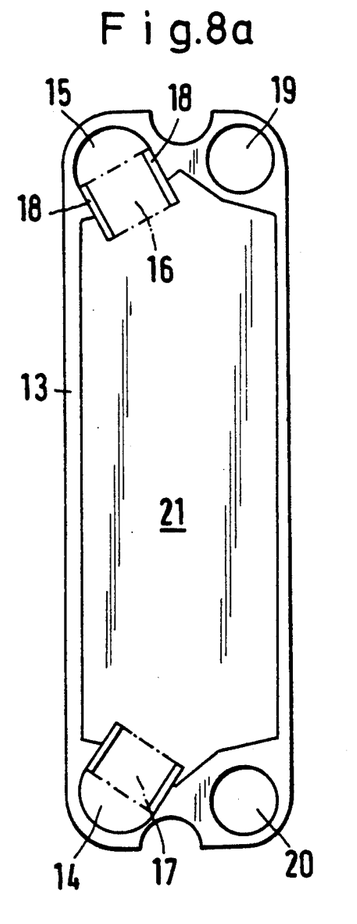
FIG. 8a shows the frame of a plate apparatus comprising two integrated channel plate assemblies in accordance with the invention.
Figure 8B:
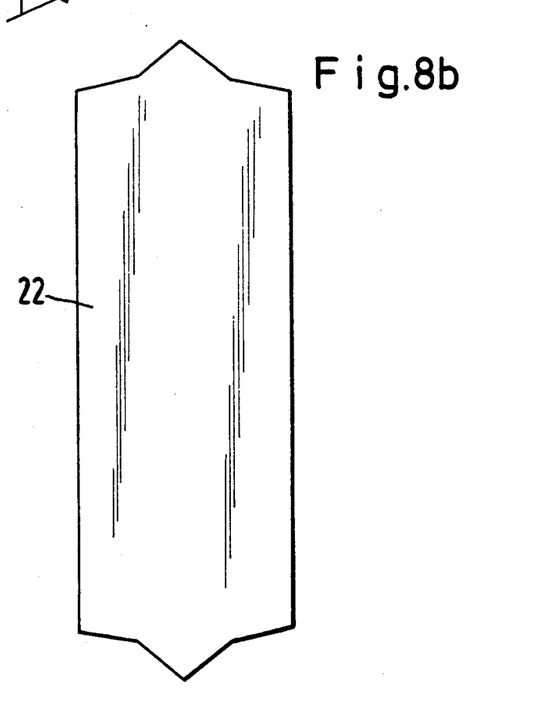
FIG. 8b shows a selectively permeably membrane for removing individual components from flowing fluids.

FIG. 8 shows a frame 13 of a plate apparatus with two integrated channel plate assemblies in accordance with the invention, which are connected to an inlet 14 and to an outlet 15, respectively, for a first flowing fluid. The frame 13 has also bores 19, 20 for a second flowing fluid. As is apparent from FIG. 7b the channel plate assemblies shown in phantom are disposed in apertures 16, 17 of the frame 13 and joined to the frame 13 at supports 18. The frame 13 consists, as a rule, of sealing material, and is disposed between two flow-guiding plates 12, and between said flow-guiding plates defines a flow-utilizing space 21. In separators for removing individual components from flowing fluids a selectively permeable membrane as shown in FIG. 8b is fixed on one side of the frame 13. Through the inlet 14 for a first flowing fluid the flowing fluid to be separated flows directly to the selectively permeable membrane 22 and flows over that membrane toward the outlet 15 for a first flowing fluid.

Figure 9:
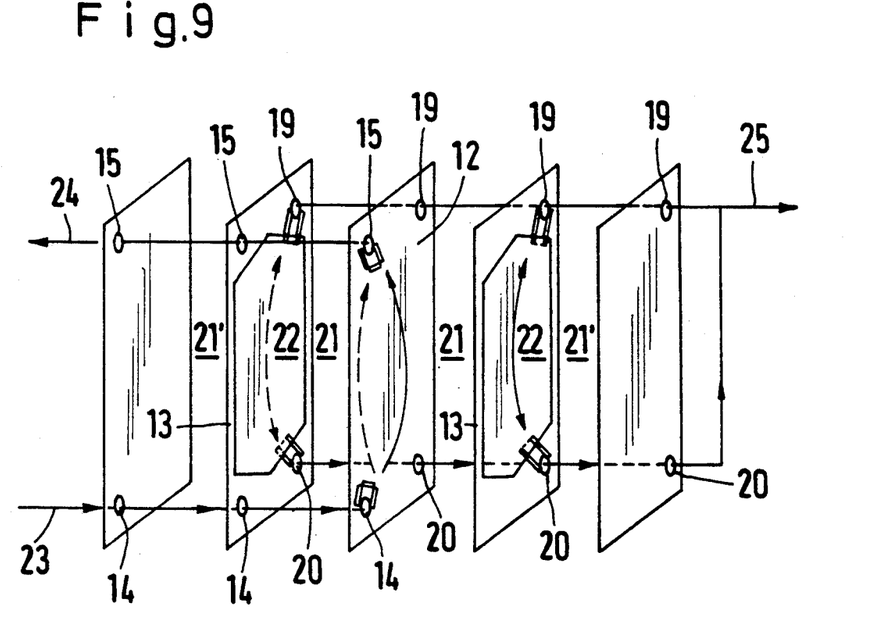
FIG. 9 shows an embodiment of a plate apparatus for removing individual components from flowing fluids by means of selectively permeable sheet material.

FIG. 9 is a simplified view illustrating the basic design of a separator which consists of a plate apparatus. The flowing fluid which is to be separated flows through the inlet 14 for a first flowing fluid to the flow-guiding plate 12 and is uniformly distributed on both sides of the flow-guiding plate 12 by a channel plate assembly which is connected to the inlet 14. The flow-guiding plate 12 extends between two frames 13, each of which is provided with a selectively permeable membrane 22 on that side which faces the flow-guiding plate 12. The membranes 22 are permeable to one component of the flowing fluid which is to be separated and that component becomes available on the rear side of the membrane. The flowing fluid to be separated flows in the flow-utilizing spaces 21 on both sides of the partition 12 to the outlet 15 for a first flowing fluid and the permeate 25 enters the flow-utilizing internal spaces 21 and further through channel plate assemblies to the bores 19, 20, which are provided in the frames 13 and serve to conduct a second flowing fluid. The retantate 24 consisting of the remainder of the flowing fluid which is to be separated is discharged from the plate apparatus through the outlet 15 for a first flowing fluid. But the channel plate assemblies in accordance with the invention may alternatively be integrated in separators which are similar to the separator described in Published German Application 36 01 909.

Figure 10:
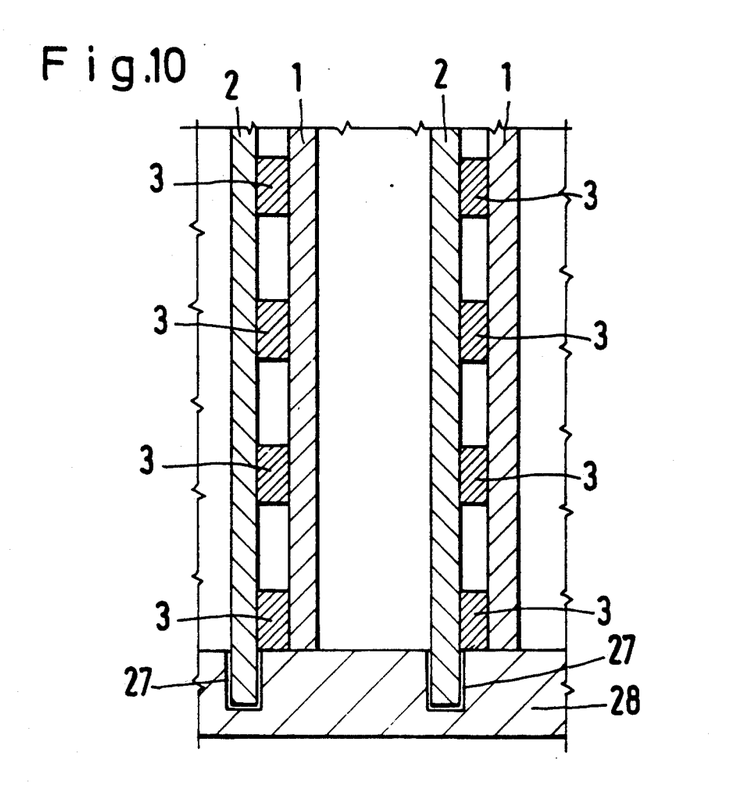
FIG. 10 is a fragmentary view showing a part of a plate-type heat exchanger with two integrated channel plate assemblies in accordance with the invention.

FIG. 10 is a fragmentary view showing a part of a plate-type heat exchanger that is provided with two channel plate assemblies which are in accordance with the invention and in each of which the second plate 2 is larger than the first plate 1. Both channel plate assemblies have passages 8 to 11 for a first flowing fluid. A further passage 26 for a second flowing fluid is provided between the two channel plate assemblies. Each channel plate assembly is joined in a groove 27 to the housing 28 of the plate-type heat exchanger.

It will be understood that each of the elements described above, or two or more together, may also find a useful application in other types of constructions and methods differing from the types described above.

While the invention has been illustrated and described as embodied in a channel plate assembly, as well as a process and a fixture for manufacturing the same, and a plate apparatus provided with the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A plate apparatus comprising means forming an inlet and an outlet for a first fluid medium; a plurality of parallel plates defining first plural parallel passages extending between the inlet and the outlet, each inlet and/or outlet having associated therewith a channel plate assembly for communicating said passage with the inlet and/or outlet, each said channel plate assembly having a plurality of parallel plates and a plurality of spacers interconnecting said parallel plates with one another to form second passages for passing the first fluid medium from said inlet to one of said first passages, or from of said first passages to said outlet.

2. A plate apparatus as defined in claim 1; and further comprising a flow-guiding plate, said channel plate assembly being mounted in and flush with said flow guiding plate.

3. A plate apparatus as defined in claim 1; and further comprising a frame, said channel plate assembly being mounted in and flush with said frame.

4. A plate apparatus as defined in claim 1; and further comprising a separator for removing individual components from flowing fluids by means of selectively permeable sheet material and including at least one stack of plate-like components with flow-guiding plates of heat exchangers and with flow-utilizing internal spaces with integrated inlets and outlets for a first flowing fluid.

5. A plate apparatus as defined in claim 1; and further comprising a plate-type heat exchanger having at least one further passage for a second flowing fluid provided between two of such parallel channel plate assemblies.

* * * * *